United States Patent
Hidaka et al.

(10) Patent No.: US 10,146,046 B2
(45) Date of Patent: Dec. 4, 2018

(54) INFORMATION PROVIDING METHOD, INFORMATION PROVIDING APPARATUS, INFORMATION PROCESSING APPARATUS, INFORMATION PROVIDING SYSTEM, AND COMPUTER-READABLE RECORDING MEDIUM

(71) Applicant: FUJITSU LIMITED, Kawasaki-shi, Kanagawa (JP)

(72) Inventors: Hiroshi Hidaka, Kawasaki (JP); Yuichi Murase, Yokohama (JP); Keiju Okabayashi, Sagamihara (JP); Shan Jiang, Zama (JP); Katsushi Sakai, Zama (JP); Junya Fujimoto, Atsugi (JP); Moyuru Yamada, Machida (JP); Shizuko Ichikawa, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/685,608

(22) Filed: Aug. 24, 2017

(65) Prior Publication Data
US 2017/0371153 A1    Dec. 28, 2017

Related U.S. Application Data

(63) Continuation of application No. PCT/JP2015/056000, filed on Feb. 27, 2015.

(51) Int. Cl.
*H04N 9/31* (2006.01)
*G02B 27/00* (2006.01)
(Continued)

(52) U.S. Cl.
CPC ............ *G02B 26/101* (2013.01); *G01B 11/00* (2013.01); *G01B 11/24* (2013.01);
(Continued)

(58) Field of Classification Search
CPC .. H04N 9/3194; H04N 5/23238; G03B 21/14; G03B 21/20; G01B 11/00; G01B 11/24; G02B 27/0093; G06K 9/00362
See application file for complete search history.

(56) References Cited

U.S. PATENT DOCUMENTS

2005/0128437 A1\* 6/2005 Pingali ................. H04N 9/3194
353/69
2011/0205497 A1    8/2011 Wakabayashi et al.

FOREIGN PATENT DOCUMENTS

| JP | 8-86615 | 4/1996 |
| JP | 2000-244674 | 9/2000 |

(Continued)

OTHER PUBLICATIONS

International Search Report dated Apr. 14, 2015 in corresponding International Patent Application No. PCT/JP205/056000.

*Primary Examiner* — Ryan D Howard

(57) ABSTRACT

An information providing method includes: measuring a static object three-dimensionally in an environment, by a processor; sequentially measuring a position of a dynamic object in the environment, by the processor; transmitting measurement data of the static object measured to a predetermined information processing apparatus through a communication network; transmitting measurement data of the dynamic object measured to the information processing apparatus through a communication network; receiving support data rem the information processing apparatus based on an environment grasping image that is generated from the measurement data, of the static object and the measurement data of the dynamic object by the information processing apparatus; and presenting the received support data to the environment at predetermined timing, by the processor.

7 Claims, 13 Drawing Sheets

(51) Int. Cl.
*G06F 3/01* (2006.01)
*G02B 26/10* (2006.01)
*G01B 11/00* (2006.01)
*G01B 11/24* (2006.01)
*G09G 3/02* (2006.01)
*G06K 9/00* (2006.01)
*G09G 3/20* (2006.01)
*H04N 5/232* (2006.01)
*H04N 5/33* (2006.01)
*H04N 9/04* (2006.01)
*G03B 21/14* (2006.01)
*G03B 33/06* (2006.01)

(52) U.S. Cl.
CPC ......... *G02B 27/0093* (2013.01); *G06F 3/017* (2013.01); *G06K 9/00362* (2013.01); *G09G 3/025* (2013.01); *G09G 3/20* (2013.01); *H04N 5/23238* (2013.01); *H04N 5/33* (2013.01); *H04N 9/045* (2013.01); *H04N 9/3129* (2013.01); *G03B 21/14* (2013.01); *G03B 33/06* (2013.01); *G09G 2354/00* (2013.01); *H04N 9/3194* (2013.01)

(56) References Cited

FOREIGN PATENT DOCUMENTS

| JP | 2004-4297 | 1/2004 |
|----|-----------|--------|
| JP | 2005-322055 | 11/2005 |
| JP | 2011-44098 | 3/2011 |
| JP | 2011-170658 | 9/2011 |
| JP | 2011-186947 | 9/2011 |

\* cited by examiner

FIG.13
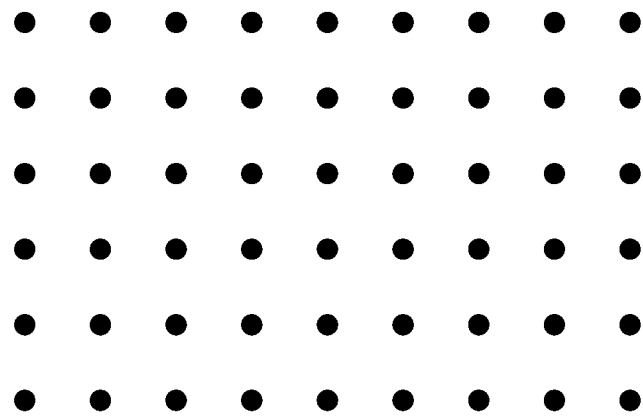
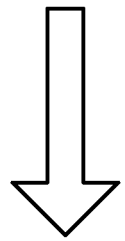
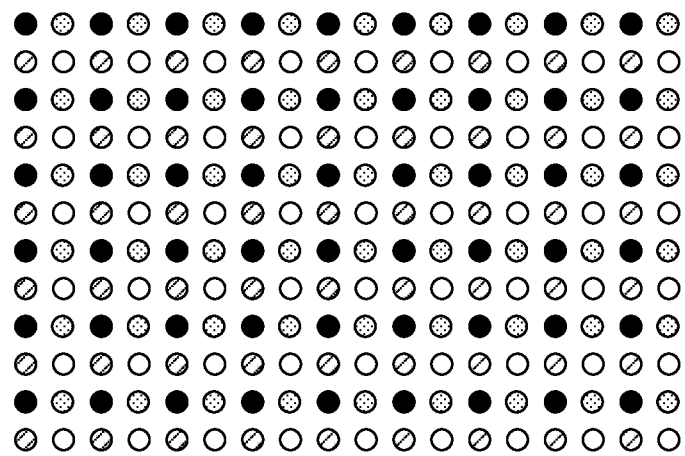

INFORMATION PROVIDING METHOD, INFORMATION PROVIDING APPARATUS, INFORMATION PROCESSING APPARATUS, INFORMATION PROVIDING SYSTEM, AND COMPUTER-READABLE RECORDING MEDIUM

CROSS-REFERENCE TO RELATED APPLICATION

This application is a continuation application of International Application No. PCT/JP2015/056000, filed on Feb. 27, 2015 and designating the U.S., the entire contents of which are incorporated herein by reference.

FIELD

The embodiments discussed herein are related to an information providing method, a computer-readable recording medium, an information providing apparatus, an information processing apparatus, and an information providing system.

BACKGROUND

As one example of a technique to support operation at various sites of maintenance and construction of facilities, a medical site, and the like, an image display apparatus and an information providing apparatus for supporting operation have been proposed.

For example, an image display apparatus includes a position/orientation measuring unit that calculates a position and an orientation of a portable computer using an image obtained from a camera and measurement data of the position/orientation measuring unit. Furthermore, the image display apparatus includes a projection-information retrieving unit that retrieves image information relating to an image to be projected and an arrangement and a shape of an object from projection information data base and object arrangement/shape database. Moreover, the image display apparatus includes an image-information generating unit that generates an image to be projected from the retrieved image information, based on a relative positional relationship between an image projector device and the object, and on the shape of the object.

Furthermore, the information providing apparatus for supporting operation is to perform, by pointing, for example, with a laser pointer, a specific object in a projection image projected by a projector, processing that is associated with the object. This information providing apparatus for supporting operation includes an image transceiving unit that transmits and receives a projection image taken by a camera, and a display unit that displays a camera image. Moreover, the information providing apparatus for supporting operation includes an information accumulating unit that accumulates a display position and a display attribute of a subject of projection by a projector on a displayed camera image, and a processing associated with the subject of projection in an associated manner. Furthermore, the information providing apparatus for supporting operation includes a data input unit that instructs on and off of display of an accumulated subject of projection and on and off or performance of processing associated thereto. Moreover, the information providing apparatus for supporting operation includes a display/processing control unit that controls on and off of display of a subject of projection or performance of processing according to input instruction information (Japanese Laid-open Patent Publication No. 8-86615 and Japanese Laid-open Patent Publication 2005-322055).

However, in the above technique, a position and an action of a person at the site is not considered, and there is a case that support data suitable for a scene at which an operation is performed at the site is not provided with the technique.

That is, in either of the above image display apparatus and the above information providing apparatus for supporting operation, an image to be projected is generated or contents of projection are selected based on images picked up by a camera. However, images picked up by a camera are ones imaged through the camera view, and do not necessarily match with a position and an action of a person. Therefore, the images picked up by the camera do not necessarily depict an operation state. When an operation state is not depicted in images picked up by a camera, the image can be projected at a wrong position, or wrong contents can be projected.

SUMMARY

According to an aspect of the embodiments, an information providing method includes: measuring a static object three-dimensionally in an environment, by a processor; sequentially measuring a position of a dynamic object in the environment, by the processor; transmitting measurement data of the static object measured to a predetermined information, processing apparatus through a communication network; transmitting measurement data of the dynamic object measured to the information processing apparatus through a communication network; receiving support data from the information processing apparatus based on an environment grasping image that is generated from the measurement data of the static object and the measurement data of the dynamic object by the information processing apparatus; and presenting the received support data to the environment at predetermined timing, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 depicts an application example of a method of acquiring 3D data; and

DESCRIPTION OF EMBODIMENT

Preferred embodiments will be explained with reference to accompanying drawings. The embodiments are not intended to limit the disclosed technique. The respective embodiments can be combined appropriately within a range not causing a contradiction in processing.

[a] First Embodiment

System Configuration

Figure 1:
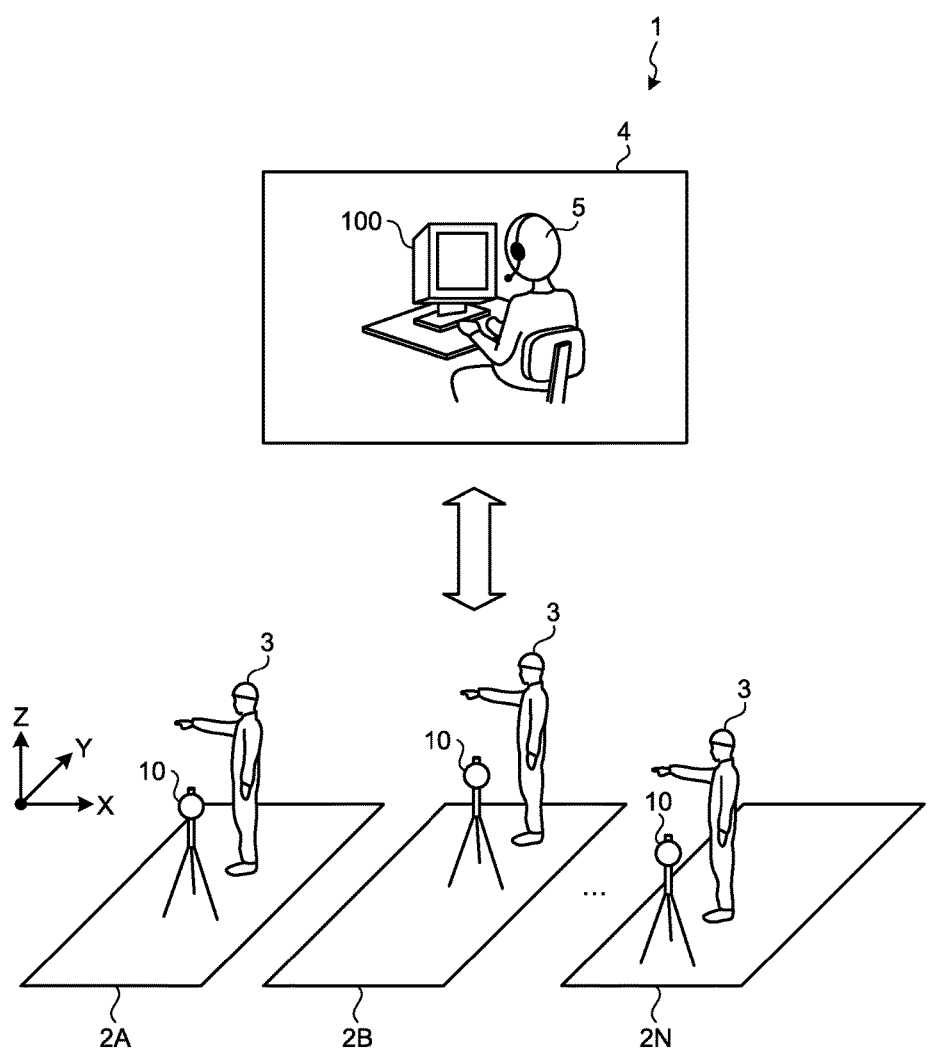
FIG. 1 depicts one example of a system configuration of an information providing system according to a first embodiment.

FIG. 1 depicts one example of a system configuration of an information providing system according to a first embodiment. FIG. 1 depicts, as an example of an operation, an example in which an inspection operation, of equipment in facilities is operated, and a site 2A to a site 2N as an example of sections in which the inspection operation is performed. Furthermore, FIG. 1 further depicts a case in which an inspection is operated by a supporter 5 that supports, from a remote site 4 away from the site 2A to the site 2N, the inspection operation operated by an on-site operator 3 in addition to the operator 3 that operates the inspection operation at the site 2A to the site 2N. In the following, the site 2A to the site 2N can be described as "site 2" when collectively called.

An information providing system 1 depicted in FIG. 1 is to provide an information providing service of providing support data that is useful for an inspection operation at the site 2 to the operator 3. As a part of this information providing service, the information providing system 1 performs three-dimensional measurement about a static object in an environment, and two-dimensional measurement of a position of a dynamic object in the environment, and provides support data that is generated at the remote site 4 through an environment grasping image based on the measurement data to the site 2. Thus, the support data is generated through the environment grasping image in which information about a position and an action of a parson is digitalized in the environment of the site 2, and as a result, support data suitable for a scene at which an operation is performed at the site 2 can be provided.

As depicted in FIG. 1, the information providing system 1 contains an information providing apparatus 10 and an information processing apparatus 100. Although an example of arranging one unit each of the information providing apparatus 10 and the information processing apparatus 100 is given herein as one example, multiple units of the information processing apparatuses 100 can be arranged per one unit of the information providing apparatus 10, or multiple units of the information providing apparatuses 10 can be arranged per one unit of the information processing apparatus 100.

The information providing apparatus 10 and the information processing apparatus 100 are connected to each other through a predetermined network such that mutual communication is possible. As one example of the network, any kind of network such as the Internet, a local area network (LAN), and a virtual private network (VPN) can be adopted irrespective of wired or wireless network. Besides, a near-field radio communication such as Bluetooth (registered trademark) low energy (BLE) can be applied to connect to enable mutual communication.

The information providing apparatus 10 is an apparatus that provides, to the operator 3 at the site 2, support data according to an instruction from the information processing apparatus 100.

As an embodiment, the information providing apparatus 10 is implemented as a portable apparatus carried by the operator 3 by hand. For example, when the operator 3 is to perform an inspection operation at the site 2A to the site 2N, it is not necessary to provide one unit of the information providing apparatus 10 each for each of the sites 2, but one unit of the information providing apparatus 10 can be shared by carrying the information providing apparatus 10 to each of the sites 2. That is, the operator 3 can bring the information providing apparatus 10 by a hand carrier or the like to the next site 2 each time an inspection operation is finished at the site 2, and can place at an arbitrary position in the next site 2, and thus can receive support data.

For one example, the information providing apparatus 10 performs the three-dimensional measurement described above when an installation position of the information providing apparatus 10 is changed, and transmits the three-dimensional measurement data to the information processing apparatus 100 at the remote site 4. The information providing apparatus 10 then repeats the two-dimensional measurement described above until the installation position of the information providing apparatus 10 is changed, and transmits the two-dimensional measurement data to the information processing apparatus 100 at the remote site 4 each time the two-dimensional measurement is performed. When receiving the support data described above from the information processing apparatus 100 at the remote site 4 after transmission of these three-dimensional and two-dimensional data, the information providing apparatus 10 projects an image corresponding to the support data at a predetermined position of the site 2 according to a presentation condition of the support data received along with the support data.

A change of the installation position described, above can be detected by providing a mechanical switch that turns ON when the information, providing apparatus 10 is placed on a ground, and tarns OFF when carried. Alternatively, it can be detected by being informed of leaving from the site 2 and arriving at the site 2, through a graphical user interface (GUI) that is provided by an application program for inspection operation management that operates on a portable terminal device carried by the operator 3. Alternatively, it can be detected based on whether an access point of a wireless LAN to which the information providing apparatus 10 is connected is switched to another, or can toe detected based on whether there is a change in positional information measured by a global positioning system (GPS) receiver.

The information processing apparatus 100 is a computer that generates the support data described, above.

As an embodiment, the information processing apparatus 100 is implemented as a personal computer that is used by the supporter 5 at the remote site 4. The "remote site" herein is not limited to a place physically far in distance from the site 2, but includes a place that is separated to the extent that sharing information with the site 2 in a face to face manner is difficult.

For example, when receiving the three-dimensional and the two-dimensional measurement data from the information providing apparatus 10, the information processing apparatus 100 generates a site grasping screen on which the a three-dimensional model of the operator 3 is superimposed at a position of the operator 3 corresponding to the two-dimensional measurement data on the three-dimensional image of the site 2 that is rendered from the three-dimensional measurement data, to display on a predetermined display unit. Thereafter, the information processing apparatus 100 updates a three-dimensional position of the operator 3 on the site grasping screen each time the information processing apparatus 100 receives two-dimensional measurement data from the information providing apparatus 10. When, accepting specification of a target on the site grasping screen, the information processing apparatus 100 generates support, data relating to the target and transmits the support data to the information providing apparatus 10.

Portable Information Providing Apparatus 10

Figure 2:
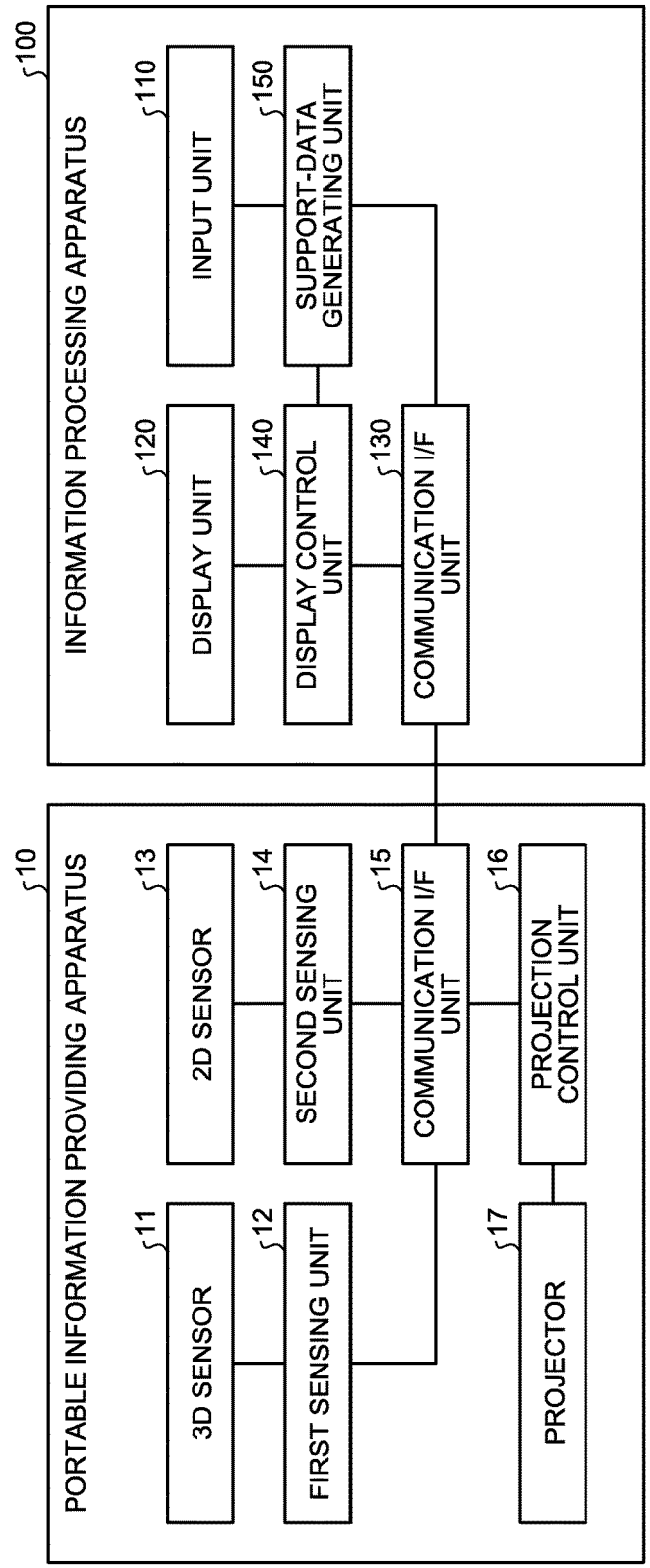
FIG. 2 is a block diagram depicting a functional configuration of each apparatus included in the information providing system according to the first embodiment.

FIG. 2 is a block diagram depicting a functional configuration of each apparatus included in the information providing system 1 according to the first embodiment. As depicted in FIG. 2, the portable information providing apparatus 10 includes a 3D sensor 11, a first sensing unit 12, a 2D sensor 13, a second sensing unit 14, a communication interface (I/F) unit 15, a projection control unit 16, and a projector 17.

The 3D sensor 11 is a three-dimensional scanner that outputs physical form of a space.

As an embodiment, the 3-D sensor 11 can be implemented as a three-dimensional scanner that includes an infrared (IR) camera and an RGB camera. The IR camera and the RGB camera have the same resolution, and share three-dimensional coordinates of a group of points handled on a computer also. For example, in the 3D sensor 11, synchronizing with the IR camera imaging a distance image by measuring time for an irradiation beam of infrared ray to be reflected to be returned, the RGB camera images a color image. Thus, distance (X, Y, Z) and color information (R, G, B) are acquired per pixel corresponding to an angle of view of the 3D sensor 11, that is, per point corresponding to the resolution in a three-dimensional space. In the following, just for an example, a case in which the 3D sensor 11 has a resolution of 640 pixels width×480 pixels height is assumed.

The first sensing unit 12 is a processing unit that senses a static object in an environment by using the 3D sensor 11.

As an embodiment, the first sensing unit 12 starts 3D sensing when a power source of the information providing apparatus 10 is switched from an OFF state to an ON state, or when there is a change in an installation position of the information providing apparatus 10.

Figure 3:
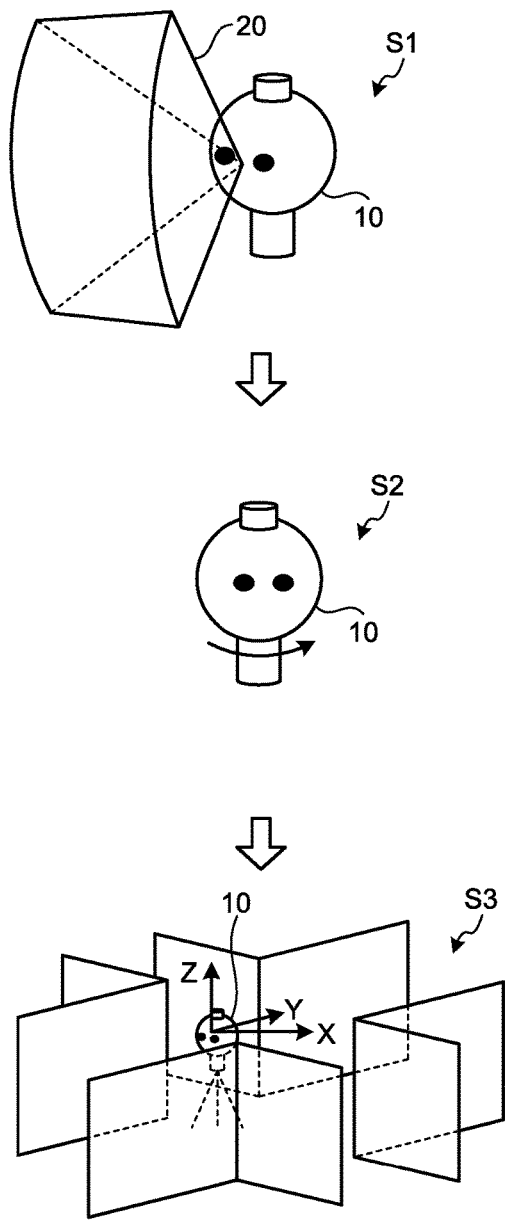
FIG. 3 depicts one example of three-dimensional (3D) sensing.

FIG. 3 depicts one example of the 3D sensing. In FIG. 3, it is assumed that 3D sensing data with 360° field of view in a horizontal direction is generated by panning the 3D sensor 11 in the horizontal direction, that is, around a Z axis in the three-dimensional coordinate system depicted in FIG. 1 by driving a motor not depicted. Furthermore, in FIG. 3, as one example of an angle of view of the 3D sensor 11, an angle of view "45°" in a vertical direction and an angle of view "60°" in a horizontal direction are indicated as a reference symbol 20.

For example, when the 3D sensing is started, the first sensing unit 12 acquires 3D data, that is, a distance image and a color image, by causing the 3D sensor 11 to image a distance image and a color image (S1).

Subsequently, the first sensing unit 12 pans the 3D sensor 11 about the Z axis for a predetermined angle, for example, 60° as an example of an angle of view in this example (S2).

Thus, the first sensing unit 12 acquires 3D data with a new angle of view after panning. Thereafter, the first sensing unit 12 repeats panning and acquisition of 3D data until 3D data of the entire direction in the horizontal direction, that is, 360° is acquired by panning for predetermined times, for example, five times for the angle of view in this example. When having acquired 3D data of the entire direction in the horizontal direction, the first sensing unit 12 generates 3D sensing data, so-called point cloud (X, Y, Z, R, G, B) by merging the 3D data acquired through six times of acquisition (S3). For a coordinate system of the 3D sensing data, a three-dimensional coordinate system having the origin point, at the information providing apparatus 10 is adopted as an example, but it is not limited thereto. For example, the origin point of the three-dimensional coordinate system can be at any position, and it can be converted into a global coordinate system from correspondence with global coordinates associated with augmented reality (AR) markers.

The 3D sensing data thus generated by the first sensing unit 12 is transmitted to the information processing apparatus 100 through the communication I/F unit 15. It is assumed herein, for example, that the 3D sensing data is transmitted once each time the installation position of the information providing apparatus 10 is changed in terms of suppressing a processing load on the information providing apparatus 10 and traffic of a transmission path. After the transmission of the 3D sensing data, only a live image imaged at a predetermined sampling frequency by the RGB camera ox the 3D sensor 11 is to be transmitted.

The 2d sensor 13 is a sensor to measure a two-dimensional distance.

As an embodiment, a laser range finder, a millimeter wave radar, a laser radar, or the like can be adopted for the 2D sensor 13. For example, a distance on a horizontal plane, that is, an XY plane, with the origin point at the information providing apparatus 10 can be acquired by rotating the 2D sensor 13 in a horizontal direction, that is, around the Z axis by driving a motor not depicted. As one example, a case in which distance measurement to acquire distance information of 1000 points per rotation can be performed with a 40 hertz (Hz) sampling frequency is assumed herein.

The second sensing unit 14 is a processing unit that senses a position of a dynamic object in an environment at the site 2.

As an embodiment, the second sensing unit 14 starts the 2D sensing at the same time when the 3D sensing is started by the first sensing unit 12, or after the 3D sensing is performed. After the 2D sensing is started, the second sensing unit 14 repeats the 2D sensing until the installation position of the information providing apparatus 10 is changed.

Figure 4:
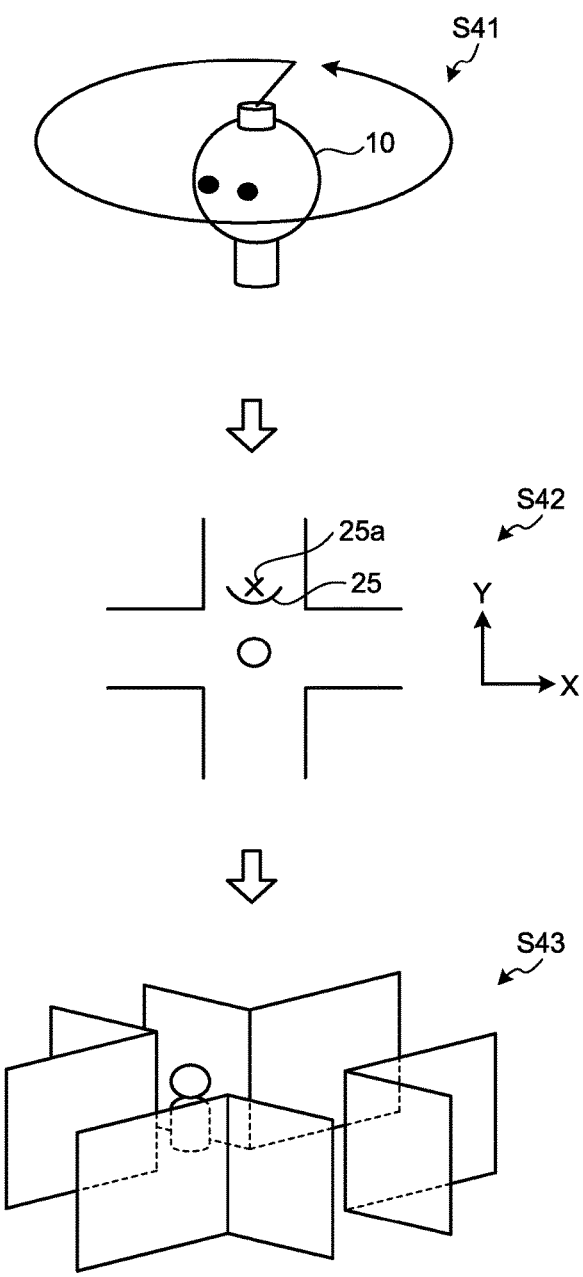
FIG. 4 depicts one example of two-dimensional (2D) sensing.

FIG. 4 depicts one example of the 2D sensing. As depicted in FIG. 4, the second sensing unit 14 acquires 2D data, that is, two-dimensional distance information of the entire direction on the XY plane by rotating the 2D sensor 13 about the Z axis (S41). Thereafter, the second sensing unit 14 detects presence of a person, by determining whether a path of a distance corresponding to a shape of a human is included in the two-dimensional distance information acquired at S1 (S42).

For example, when the 2D sensor 13 is mounted at a position having a height of 1 meter from a mounting surface of the information providing apparatus 10, a shape of a portion around a waist of the operator 3 is likely to appear in the 2D data. Thus, the second sensing unit 14 can detect presence of a person by determining whether a distance plot 25 having similarity equal to or higher than a predetermined threshold to a predetermined template, for example, a waist shape set by gender, by age, or by a direction of the waist relative to the 2D sensor 13, is present in the 2D data. At this time, to avoid erroneous detection caused by an object having similar characteristics in shape with a waist of a human, such as a mannequin, being a noise, for example, it can be arranged to remove a noise based on whether there is a difference from 2D data acquired at a time earlier than a time when the 2D data is acquired, for example, that of one time period before. For example, when a distance plot having a similar shape to that of a human waist is present in the 2D data, the second sensing unit 14 determines whether there is a difference in center of gravity 25*a* of a graphic formed on the XY plane by the distance plot 25 or in outline of the distance plot 25 between the distance plot detected in the 2D data and a distance plot detected in 2D data of one time period prior thereto. The second sensing unit 14 can be arranged to detect a person only when there is a change in at least: one of the center of gravity 25*a* and the outline of the distance plot 25.

The 2D sensing data thus generated by the second sensing unit 14 is transmitted to the information processing apparatus 100 through the communication I/F unit 15. For example, when a person is detected from the 2D data, the second sensing unit 14 transmits, for example, positional information of the person, a coordinate group of the distance plot 25 described above, and coordinates of the center of gravity 25*a*, as the 2D sensing data. Moreover, when a person is not detected from the 2D data, the second sensing unit 14 transmits a notification indicating that a person is not present, as the 2D sensing data.

As the positional information of a person is transmitted, the information processing apparatus 100 can superimpose a three-dimensional model of fine operator 3 at a position of the operator 3 corresponding to the 2D sensing data on the 3D image of the site 2 that has been rendered from the 3D sensing data (S43). Furthermore, as 2D sensing data is transmitted each time the 2D sensing is performed, a position of the three-dimensional model of the operator 3 on the 3D image can be updated to the latest position also.

The communication I/F unit 15 is an interface that controls communication with other devices, such as the information processing apparatus 100.

As an embodiment, when the information providing apparatus 10 and the information processing apparatus 100 are connected, through, a network such as a LAN, the communication I/F unit 15 can adopt a network interface card such as a LAN card. Moreover, when the information providing apparatus 10 and the information processing apparatus 100 are connected by a near-field radio communication such as a BLE, the communication I/F unit 15 can adopt a BLE communication module. For example, the communication I/F unit 15 transmits the 3D sensing data or the 2D sensing data to the information processing apparatus 100, or receives an instruction to display support data, presentation conditions of the support data, or the like from the information, processing apparatus 100.

The projection control unit 16 is a processing unit that performs projection control for the projector 17.

As an embodiment, when receiving support data from the information processing apparatus 100 at the remote site 4, the projection control unit 16 projects an image corresponding to the support data at a predetermined position in the site 2 according to the presentation conditions of the support data received along with the support data. As an example of the presentation conditions, a position of an image to be projected at the projector 17, that is, for example, correspondence among representative points, such as a vertex and a center of gravity and display positions of the three-dimensional coordinates; image contents, that is, for example a mark, text, a static image, and a moving image; timing of projecting an image on the projector 17, that is, for example, specification of a time; and the like are included.

The projector 17 projects an image in a space. To the projector 17, an arbitrary display mode such as a liquid crystal display mode and a digital light processing (DLP) (registered trademark), and a laser mode, can be adopted.

The processing units such as the first sensing unit 12, the second sensing unit 14, and the projection control unit 16 can be implemented as follows. For example, processes that exert functions similar to those of the processing units described above are developed and executed on a memory by a central processing unit (CPU) or the like. These functional units are not necessarily requested to be executed by a central processing unit, but can be executed by a micro processing unit (MPU). Moreover, the respective functional units described above can be implemented by a hard wired logic such as an application specific integrated circuit (ASIC) and a field programmable gate array (FFGA).

Furthermore, as a main storage device used by the above processing units, various kinds of semiconductor memory devices, such as a random-access memory and a flash memory, can be adopted as an example. Moreover, a storage device referred by the above processing units can be an auxiliary storage device, not the main storage device necessarily. In this case, a hard disk drive (HDD), an optical disk, a solid state drive (SSD), or the like can be adopted.

Configuration of Information Processing Apparatus 100

As depicted in FIG. 2, the information processing apparatus 100 includes an input unit 110, a display unit 120, a communication I/F unit 130, a display control unit 140, and a support-data generating unit 150. The information processing apparatus 100 can also include a functional unit in an established computer such as various kinds of voice output devices and print devices, besides the functional units depicted in FIG. 2.

The input unit 110 is an input device that receives an input of instructions to various kinds of information, such as a specification of a target in a 3D image.

As an embodiment, when the information processing apparatus 100 is implemented as a stationary personal computer, a keyboard, a mouse, and the like can be adopted. The mouse functions as a pointing device by operating with the display unit 120 described later. As one example, a case of implementing a pointing device function with a mouse is explained herein, but the pointing device function can be implemented by other input devices such as a touch panel. As another embodiment, when the information processing apparatus 100 is implemented as a portable terminal device, it can be implemented as a touch panel by integrating the input unit 110 and the display unit 120.

The display unit 120 is a display device that displays various kinds of information, such as a 3D image.

As an embodiment, as the display unit 120, a liquid crystal display and an organic electroluminescence (EL) display that implement display by emitting light can be adopted. Moreover, a projector that implements display by projection can be adopted also as the display unit 120.

The communication I/F unit 130 is an interface that controls communication with other devices, such as the information providing apparatus 10.

As an embodiment, when the information providing apparatus 10 and the information processing apparatus 100 are connected through a network such as a LAN, the communication I/F unit 130 can adopt a network interface card such as a LAN card. Moreover, when the information providing apparatus 10 and the information processing apparatus 100 are connected by a near-field radio communication such as a BLE, cha communication I/F unit 130 can adopt a BLE communication module. For example, the communication I/F unit 130 receives 3D sensing data and 2D sensing data from the information providing apparatus 10, or transmits an instruction to display support data, presentation conditions of the support data, or the like to the information providing apparatus 10.

The display control unit 140 is a processing unit that performs display control for the display unit 120.

As an embodiment, the display control unit 140 generates a site grasping screen from the 3D sensing data and the 2D sensing data, transmitted from the information providing apparatus 10. For example, when receiving the 3D sensing data front the information providing apparatus 10, the display control unit 140 renders the 3D sensing data to generate a 3D image. Furthermore, the display control unit 140 generates a panoramic image by connecting, in a horizontal direction, images of all fields of view included in the 3D sensing data. Thus, the display control unit 140 generates a site grasping screen that includes the 3D image and the panoramic image described above to display on the display unit 120. Subsequently, when receiving the 2D sensing data from the information providing apparatus 10, the display control unit 140 superimposes a three-dimensional model of the operator 3 at a position of the operator 3 corresponding to the 2D sensing data on the 3D image of the site grasping screen to be displayed. Thereafter, each time the display control unit 140 receives the 2D sensing data, the display control, unit 140 can update the position of the three-dimensional model of the operator 3 on the 3D image of the site grasping screen to the latest position. Besides the 3D image and the panoramic image, a color image that is imaged at a predetermined sampling frequency by the RGB camera of the 3D sensor 11 from the field of view of the 3D image currently being displayed on the display unit 120 can also be included in the site grasping screen as a live image.

Figure 5:
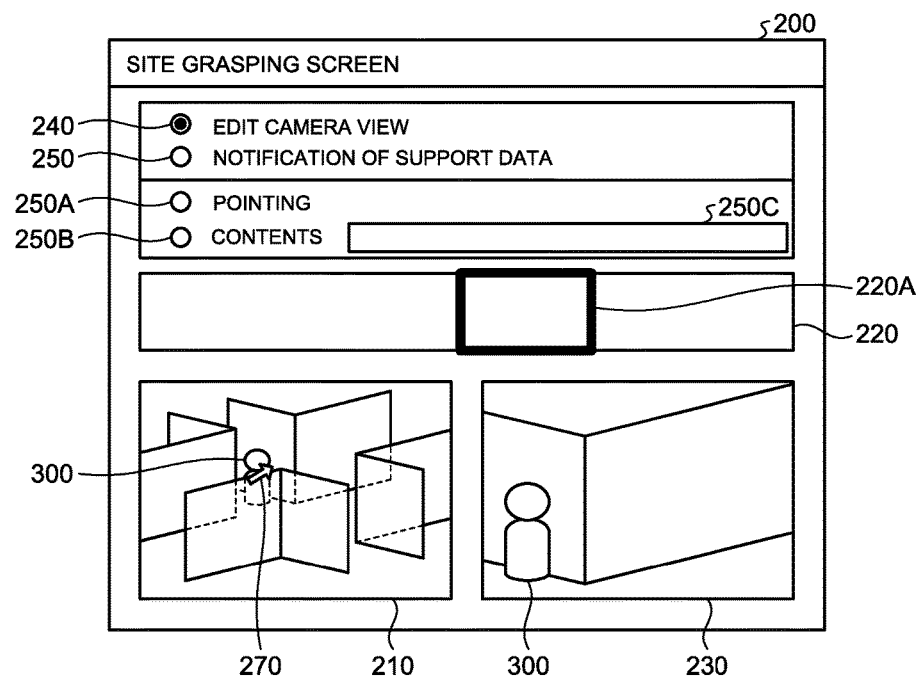
FIG. 5 depicts one example of a site grasping screen.
Figure 6:
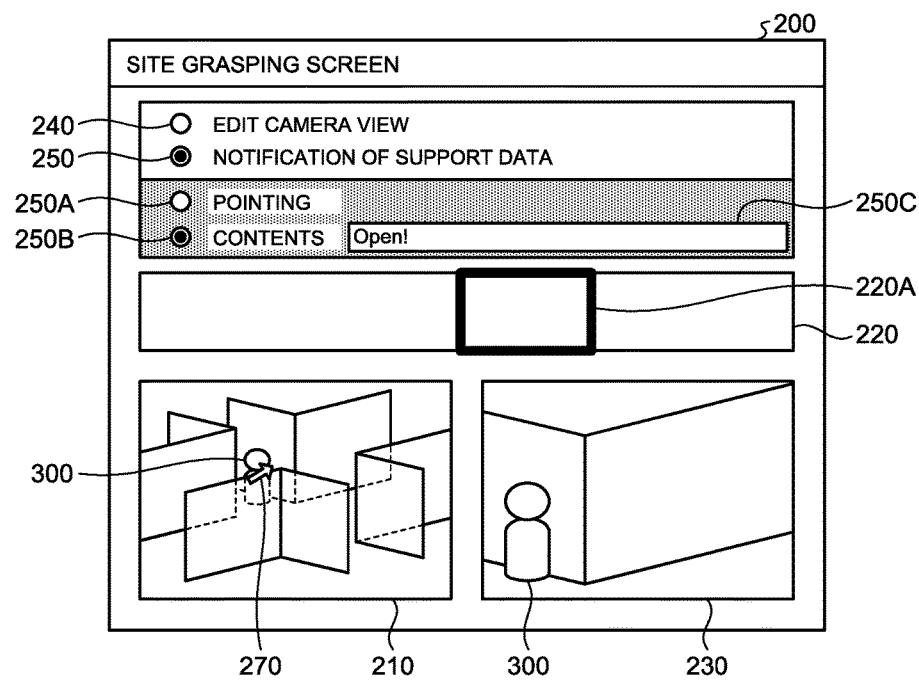
FIG. 6 depicts one example of the site grasping screen.

FIG. 5 and FIG. 6 depict one example of the site grasping screen. As depicted in FIG. 5 and FIG. 6, in a site grasping screen 200, a 3D image 210, a panoramic image 220, and a live image 230 are included. Furthermore, in the site grasping screen 200, GUI components such as radio buttons 240, 250, 250A, and 250B, and text box 250C are included. A display position of a 3D model 300 of the operator 3 that is displayed being superimposed on the 3D image 210 of the site grasping screen 200 is updated each time the 2D sensing data is received as described above.

For example, as depicted in FIG. 5, in a state in which the radio button 240 is selected, a field of view at which the 3D image 210 is rendered can be changed by accepting a predetermined operation at an arbitrary point on the 3D image 210 through the input unit 110. Furthermore, by accepting an operation to change a direction of a direction specifying pointer 270 on the 3D image 210 through the input unit 110, a field of view of the color image imaged by the RGB camera of the 3D sensor 11 can also be changed. Along with this, the field of view of the live image 230 is to be changed to a direction corresponding to the direction specifying pointer 270. Moreover, by accepting a sliding operation of a slider 220A on the panoramic image 220, and by changing the field of view of the RGB camera of the 3D sensor 11 to such a position that a region inside the slider 220A is included in the field of view of the RGB cam-era of the 3D sensor 11, the field of view of the live image 230 can also be changed. As an operation accepted through the input unit 110, for example, a drag-and-drop operation by a pointing device, a flick operation on a touch panel, and the like can be accepted.

Moreover, as depicted in FIG. 6, in a state in which the radio button 250 is selected, specification of a position of a target at which support data is to be projected on the 3D image 210 of the site grasping screen 200 can be accepted. At this time, in a state in which the radio button 250A is selected, an instruction to project an attention attracting mark or the like to call attention of the operator 3 can be accepted as the support data, with reference to the three-dimensional coordinates of the site 2 corresponding to the point at which the specification Is accepted, for example, a center, or a center of gravity of the projection image. Furthermore, in a state in which the radio button 250B is selected, when an arbitrary point on the 3D image 210 is specified through the input unit 110, an instruction to project contents such as a message "Open!" that has been input in text into the text box 250C as the support data can be accepted, with reference to the three-dimensional, coordinates or the site 2 corresponding to the point at which hue specification has been accepted. Although a case of accepting specification of a point through the input unit 110 has been given as an example herein, range specification can be accepted also. Furthermore, although a message is given herein as an example of contents, instruction to project other contents such as a still image and a moving image.

The support-data generating unit 150 is a processing unit that generates support data.

As an embodiment, when accepting specification of a position of a target at which support data is to be projected on the 3D image, the support-data generating unit 150 generates the support, data according to a positional relationship between, positional information of a person on the 3D image and a position for which the specification has been accepted.

This is specifically explained. The support-data generating unit 150 estimates an orientation of the operator 3 from a path of the positional information of the operator 3 that is transmitted from the information providing apparatus 10. For example, the support-data generating unit 150 chronologically plots the positional information of the operator 3 transmitted from the information providing apparatus 10 on the XY plane, and acquires an approximate straight line of a plot from the positional information of the operator 3 before a predetermined time to the latest positional information of the operator 3. Thus, the support-data generating unit 150 estimates a traveling direction of the approximate straight line toward the latest positional information of the operator 3 as the orientation (front side) of the operator 3, that is, as a posture. Although a case of estimating an orientation of the operator 3 from a path of positional information by the support-data generating unit 150 has been explained as an example, an orientation of the operator 3 can be estimated from a shape of a plot of distances when a person is detected by the second sensing unit 14, and be transmitted as the 2D sensing data.

The support-data generating unit 150 determines whether the position of a target for which the specification is accepted is within a predetermined angle, for example, ±α, from the orientation of the operator 3. When the position of the target is not within the predetermined angle from the orientation of the operator 3, there is a possibility that the target to which the supporter 5 is trying to attract attention of the operator 3 is not in sight of the operator 3. In this case, the support-data generating unit 150 sets a position in the three-dimensional coordinates corresponding to a front of the operator 3 out of the three-dimensional coordinates included in the 3D sensing data as a projection position of the site 2, and instructs the information providing apparatus 10 to project a guiding mark, for example, an arrow, as the support data. The projection position can define an X coordinate and a Y coordinate of an intersection point with the approximate straight line corresponding to the orientation of the operator 3 on the XY plane out of the three-dimensional coordinates included in the 3D sensing data, and a Z coordinate of a predetermined height, for example, a height corresponding to the waist, the chest, or the head of the operator 3.

On the other hand, when the position of the target is within the predetermined angle from the orientation of the operator 3, it can be estimated that there is a high possibility that the target to which the supporter 5 is trying to draw attention is in sight of the operator 3. In this case, the support-data generating unit 150 further determines whether a distance between the operator 3 and the target on the XY plane is within a predetermined distance, for example, 1 meter (M) or 3 M.

When the distance between the operator 3 and the target is not within the predetermined distance, it is found that the operator 3 has not moved to a position at which the target is easily recognized even though the target is in sight of the operator 3. In this case, the support-data generating unit 150 sets the position of the three-dimensional coordinates corresponding to a front of the operator 3 out of the three-dimensional coordinates included in the 3D sensing data, to the presentation condition as the projection position of the site 2, and instructs the information providing apparatus 10 to project a guiding mark, for example, an arrow, as the support data.

On the other hand, when the distance between the operator 3 and the target is within the predetermined distance, the target is in sight of the operator 3, and it is found that the operator 3 has moved to a position at which the target, is easily recognized. In this case, the support-data generating unit 150 sets the position of the target for which the specification has been accepted out of the three-dimensional coordinates included in the 3D sensing data to the presentation condition as the projection position of the site 2, and instructs the information providing apparatus 10 to project at least one of the attention drawing mark and contents, as the support data.

The processing units such as the display control unit 140 and the support-data generating unit 150 described above can be implemented as follows. For example, processes that exert functions similar to those of the processing units described above are developed and executed on a memory by a central processing unit, so-called CPU, or the like. These functional units are not necessarily requested to be executed by a central processing unit, but can be executed by a micro processing unit (MPU). Moreover, the respective functional units described above can be implemented by a hard wired logic such as an ASIC and an FPGA.

Furthermore, for a main storage unit used by the respective processing units, various kinds of semiconductor memory devices, such as a random access memory (RAM) and a flash memory can be adopted as one example. Moreover, the storage device referred by the respective processing units is not necessarily requested to be the main storage device, but can be an auxiliary storage device. In this case, an HDD, an optical disk, an SSD, or the like can be adopted.

Specific Example 1

Figure 7:
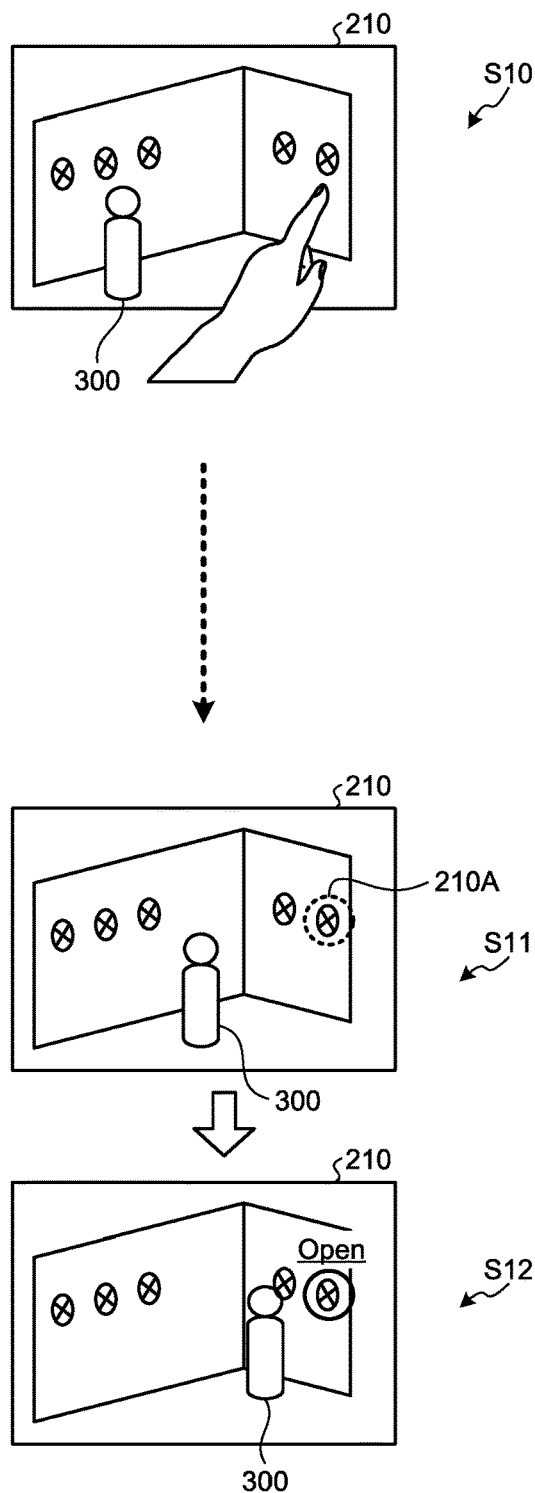
FIG. 7 depicts one example of a transition of 3D images.
Figure 8:
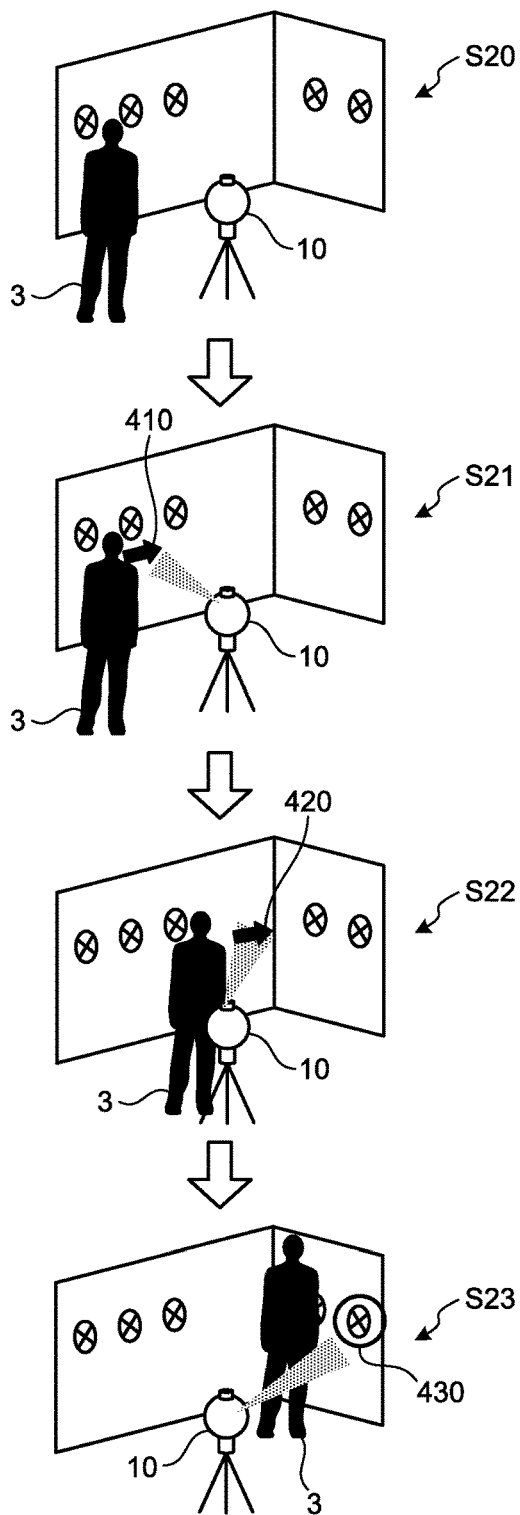
FIG. 8 depicts one example of a transition of projection images at a site.

A specific example of projection of the support data is explained using FIG. 7 and FIG. 8, FIG. 7 depicts one example of a transition of 3D images. FIG. 8 depicts one example of a transition of projection images at the site 2. In FIG. 7 and FIG. 8, an example of specifying a valve 210A as a target at which the support data is to be projected is depicted.

As depicted in FIG. 7, before specification of a position or a target at which support data is to be projected in the site 2 on the 3D image 210 is accepted (S10), the support data has not been projected in the site 2 as depicted in FIG. 8 (S20). Thereafter, when specification of the position of the valve 210A is accepted as the target at which the support data is to be projected in the site 2 on the 3D image 210 (S11), projection of the support data is started in the site 2. That is, when the specification of the position of the valve 210A is accepted, the valve 210A is not present within the predetermined angle from the front of the operator 3, and therefore, an arrow 410 to guide the operator 3 to the valve 210A is projected in front of the operator 3 as the support data (S21). Thereafter, returning to S22, the operator 3 comes closer to the valve 210A compared to the stage of S21. In this case, although the valve 210A is present within the predetermined angle from the front of the operator 3, the distance between the operator 3 and the valve 210A is not within the predetermined distance. Therefore, an arrow 420 to guide still the operator 3 to the valve 210A is projected in front of the operator 3 (S22). Returning back to 323, the operator 3 comes closer to the valve 210A compared to the stage of S22. In this case, the valve 210A is present, within the predetermined angle from the front of the operator 3, and the distance between the operator 3 and the valve 210A is within the predetermined distance. Therefore, an attention attracting mark 430 is projected on the valve 210A the support data (S23). Thus, it is possible let the supporter 5 to see that the operator 3 is facing toward and coming close to the valve 210A, and that an attention attracting mark is projected on the valve 210A also in the 3D image 210 (S12).

As described above, in the present embodiment, contents of the support data vary according to a position of the operator 3. That is, while a guiding mark is projected until the operator 3 comes close to a position at which a target is easily recognized, an attention attracting mark is projected on the target when the operator has come close to the position at which the target is easily recognized. Therefore, through, an environment grasping screen in which an environment of the site 2 is digitalized including a position and an action of a person, support data can be projected onto the site 2. Thus, support data suitable for a scene in which an operation is performed at the site 2 can be provided.

Furthermore, the information providing apparatus 10 is implemented as a portable apparatus that can be carried by the operator 3 between the site 2 and the site 2, and can be installed at any position in the site 2 when the operator 3 arrives at the site 2 at which an inspection operation is to be performed. Therefore, it enables the operator 3 to perform handsfree inspection operation. In addition, the 3D sensor 11 included in the information providing apparatus 10 is installed at any position in the site 2, and therefore, is not requested to be put on a head or the like of the operator 3. Accordingly, it is possible to suppress the live image being shaken by movement of the operator 3, for example, movement in the operation or movement of the body, resulting in enhanced level of sharing an operation state at the site 2 between the operator 3 and the supporter 5. Furthermore, equipment to be worn by the operator 3 during the inspection operation can be reduced.

Specific Example 2

Figure 9:
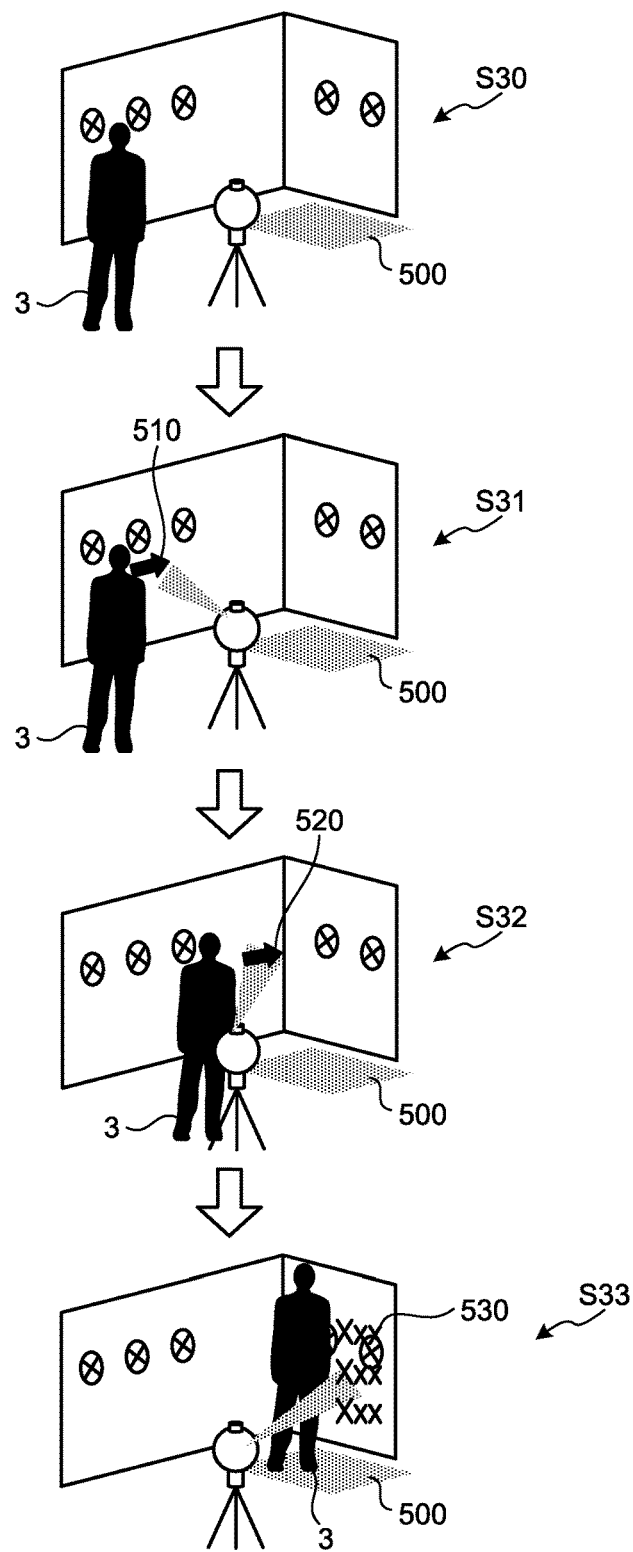
FIG. 9 depicts one example of a transition of projection images at a site.

FIG. 9 depicts one example of a transition of projection images at the site 2. FIG. 9 depicts a case in which a target at which support data is to be projected at the site 2 is specified as a region 500. Moreover, FIG. 9 depicts a case in which a target has been set prior to accepting it through the input unit 110 after the site grasping screen 200 is generated. In this case, as depicted in FIG. 9, support data has not been projected at the site 2 when the information providing apparatus 10 is installed in the site 2 (S30). Thereafter, when the information providing apparatus 10 is installed at the site 2, as a center of gravity of the region 500 is not present within the predetermined angle from a front of the operator 3, an arrow 510 to guide the operator 3 to the region 500 is projected in front of the operator 3 as the support data (S31). Thereafter, returning to S32, the operator 3 comes closer to the region 500 compared to a stage at S31. In this case, although the region 500 is present within the predetermined angle from the front of the operator 3, a distance between the operator 3 and the region 500 is not within the predetermined distance. Therefore, an arrow 520 to guide still the operator 3 to the region 500 is projected in front of the operator 3. Returning to S33, the operator 3 comes further closer to the region 500 compared to a stage of S32. In this case, the region 500 is present within the predetermined angle from, the front of the operator 3, and the distance between the operator 3 and the region 500 is within the predetermined distance, and therefore, a message 530 including "Xxx Xxx Xxx" is projected on the valve 210A as the support data.

Although in FIG. 7 and FIG. 8, a case of accepting specification of a point of a target through the input unit 110 after the site grasping screen 200 is generated has been explained as an example, a target can be set in advance to reduce an operation to specify the target at the time when the site grasping screen 200 is generated, or a region can be set instead of a point as a position of the target as depicted in FIG. 9. In this case also, support data suitable for a scene in which an operation is performed at the site 2 can be provided. Furthermore, the level of sharing an operation state between the operator 3 and the supporter 5 can be enhanced, and equipment to be mounted on the operator 3 during an inspection operation can be reduced.

Flow of Processing

Subsequently, a flow of processing performed by the information providing system according to the present embodiment is explained. Herein, (1) sensing processing performed by the information providing apparatus 10, (2) display control processing performed by the information processing apparatus 100, and (3) information, provision processing are explained in this order.

(1) Sensing Processing

Figure 10:
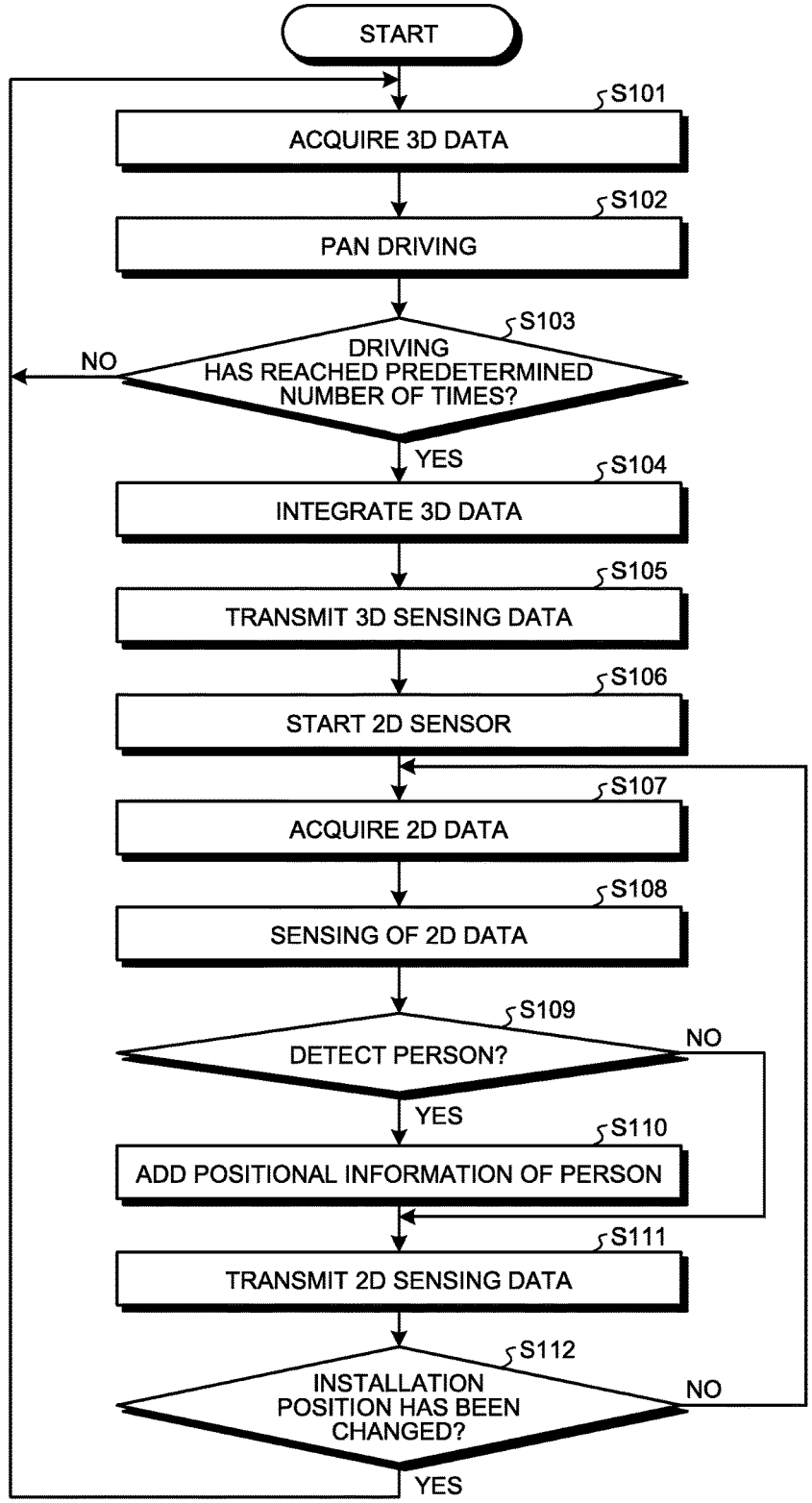
FIG. 10 is a flowchart indicating a procedure of sensing processing according to the first embodiment.

FIG. 10 is a flowchart indicating a procedure of the sensing processing according to the first embodiment. This processing is started when the power source of the information providing apparatus 10 is switched from the OFF state to the ON state, or when the installation position of the information providing apparatus 10 is changed. The processing indicated in FIG. 10 is repeated until the power source of the information providing apparatus 10 is switched to the OFF state.

By causing the 3D sensor 11 to image a distance image and a color image, the first sensing unit 12 acquires 3D data, that is, the distance image and the color image (step S101). Subsequently, the first sensing unit 12 pans the 3D sensor 11 about the Z axis by a predetermined angle, for example, 60° in an example of an angle of view in this example (step S102).

The first sensing unit 12 repeats the processing at step S101 and step S102 until the panning is performed for the predetermined number of times, for example, for five times (step S103: NO).

Thereafter, when the panning has been performed for the predetermined number of times (step S103: YES), the first sensing unit 12 unifies 3D data 3 that is acquired in ail directions in a horizontal direction, to generate 3D sensing data (step S104). The first sensing unit 12 transmits the 3D sensing data generated at step S104 to the information processing apparatus 100 (step S105).

After processing at step S105, the second sensing unit 14 starts 2D sensing (step S106). Subsequently, the second sensing unit 14 drives the 2D sensor 13 to rotate about the Z axis, to acquire 2D data, that is, two-dimensional distance information of all directions on the XY plane (step S107).

Thereafter, the second sensing unit 14 detects whether a person is present based on whether a path of distances corresponding to a human shape is included in the two-dimensional distance information that is acquired at step S107 (step S108).

When a person is detected (step S109: YES), the second sensing unit 14 adds positional information of the person detected at step S108 (step S110), and includes the color image imaged by the RGB camera included in the 3D sensor 11, to transmit the 2D sensing data to the information processing apparatus 100 (step S111).

On the other hand, when a person is not detected (step S109: NO), the second sensing unit 14 transmits only the color image imaged by the RGB camera included: in the 3D sensor 11 to the information processing apparatus 100 as the 2D sensing data (step S111). In this case also, notification that a person has not been detected can be included in the 2D sensing data.

Thereafter, until the installation position of the information providing apparatus 10 is changed (step S112: NO), the processing from step S107 to step S111 is repeated. When the installation position of the information providing apparatus 10 is changed (step S112: YES), returning back to step S101, the processing at step S101 and after is repeated as described above.

(2) Display Control Processing

Figure 11:
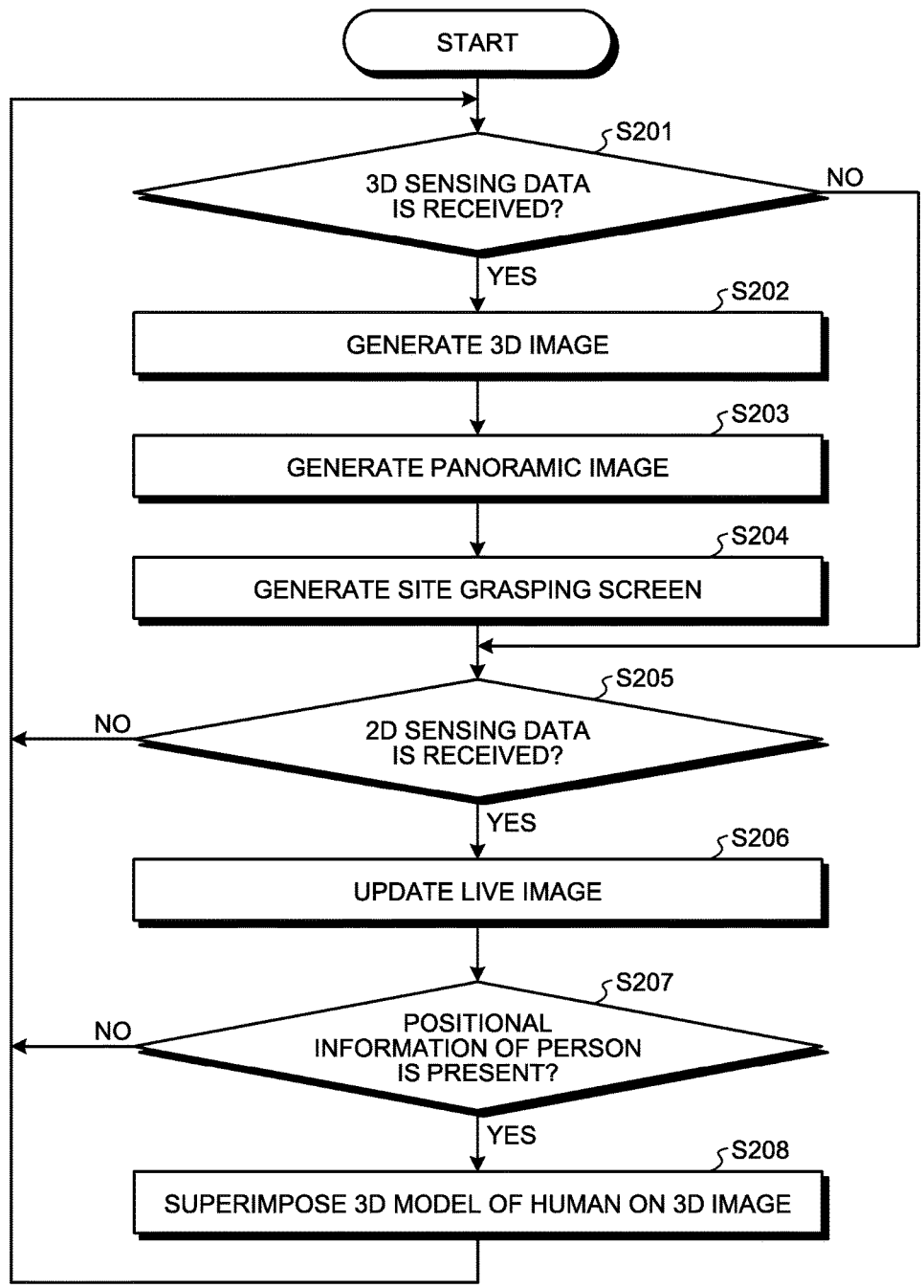
FIG. 11 is a flowchart indicating a procedure of display control processing according to the first embodiment.

FIG. 11 is a flowchart indicating a procedure of the display control processing according to the first embodiment. This processing is repeated as long as the communication with the information providing apparatus 10 is established.

As depicted in FIG. 11, when receiving the 3D sensing data from the information providing apparatus 10 (step S201: YES), the display control unit 140 renders the 3D sensing data to generate a 3D image (step S202). When having not received the 3D sensing data (step S201: NO), it is shifted to the processing at step S205.

Furthermore, the display control unit 140 generates a panoramic image by connecting images of all fields of view included in the 3D sensing data in a horizontal direction (step S203). Thus, the display control unit 140 generates the site grasping screen including the 3D image and the panoramic image described above, and causes the display unit 120 to display it (step S204).

When receiving the 2D sensing data from the information providing apparatus 10 thereafter (step S205: YES), the display control unit 140 displays the color image that is included in the 2D sensing data received at step S205, in the site grasping screen as a live image (step S206).

Furthermore, when positional information of a person is included in the 2D sensing data (step S207: YES), the display control unit 140 displays the three-dimensional model of the operator 3 at a position of the operator 3 corresponding to the 2D sensing data on the 3D image of the site grasping screen (step S208). Thereafter, the display control unit 140 returns to the processing at step S201, and repeats the processing thereafter.

(3) Information Provision Processing

Figure 12:
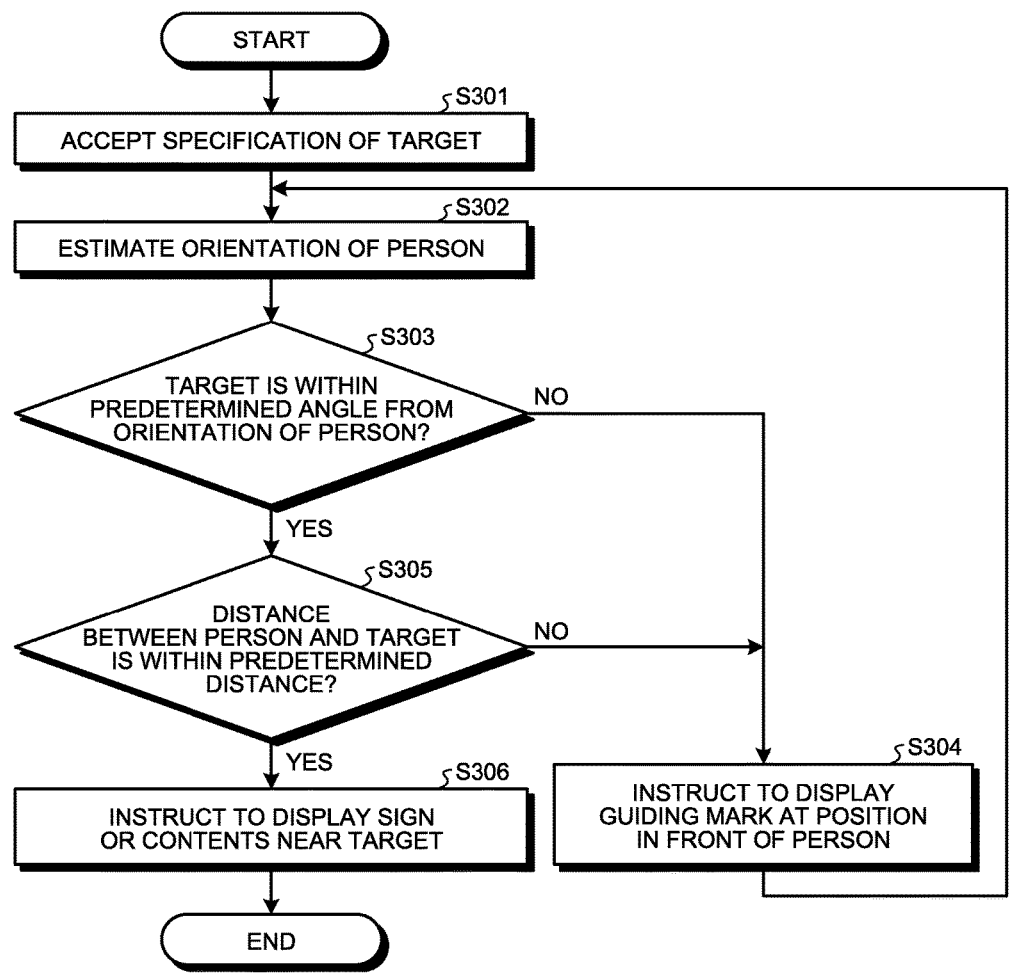
FIG. 12 is a flowchart indicating a procedure of information provision processing according to the first embodiment.

FIG. 12 is a flowchart indicating a procedure of the information provision processing according to the first embodiment. This processing is started when specification of a position of a target at which support data is to be projected on the 3D image is accepted.

As indicated in FIG. 12, when accepting specification of a position of a target at which support data is to be projected on the 3D image (step S301), the support-data generating unit 150 estimates an orientation of the operator 3 from a path of the positional information of the operator 3 that is transmitted from the information providing apparatus 10 (step S302).

The support-data generating unit 150 determines whether the position of the target for which the specification has been accepted at step S301 is within the predetermined, angle from the orientation of the operator 3 (step S303). When the position of the target is not within the predetermined angle from the orientation of the operator 3 (step S303: NO), there is a possibility that the target to which the supporter 5 is trying to draw attention of the operator 3 is not in sight of the operator 3.

In this case, the support-data generating unit 150 sets a position of three-dimensional coordinates corresponding to a front of the operator 3 out of the three-dimensional coordinates included in the 3D sensing data to the presentation condition as a projection position of the site 2, and instructs the information providing apparatus 10 to project a guiding mark, for example, an arrow as the support data (step S304). Thus, in the information providing apparatus 10, the guiding mark is to be projected in front of the operator 3. Thereafter, it returns to the processing at step S302.

On the other hand, when the position of the target is within the predetermined angle from the orientation of the operator 3 (step S303: YES), it can be estimated that there is a high possibility that the target to which the supporter 5 is trying to draw attention of the operator 3 is in sight, of the operator 3. In this case, the support-data generating unit 150 further determines whether a distance between the operator 3 and the target on the XY plane is within a predetermined distance (step S305).

When the distance between the operator 3 and the target is not within the predetermined distance (step S305: NO), it is found that the operator 3 has not moved to a position at which the target is easily recognized even though the target is in sight of the operator 3. In this case, the support-data generating unit 150 sets the position of the three-dimensional coordinates corresponding to a front of the operator 3 out of the three-dimensional coordinates included in the 3D sensing data, to the presentation condition as the projection position of the site 2, and instructs the information providing apparatus 10 to project a guiding mark, for example, an arrow, as the support data (step S304). Thus, in the information providing apparatus 10, a guiding mark is to be projected in front of the operator 3. Thereafter, it returns to step S302.

When the distance between the operator 3 and the target is within the predetermined distance (step S305: YES), the target is in sight of the operator 3, and it is found that the operator 3 has come to the position at which the target is easily recognized. In this case, the support-data generating unit 150 sets the position of the target for which specification has been accepted out of the three-dimensional coordinates included in the 3D sensing data to the presentation condition as the projection position of the site 2, and instructs the information providing apparatus 10 to project at least one of the attention attracting mark and contents as the support data (step S306), and finishes the processing. Thus, in the information providing apparatus 10, the guiding mark is to be projected in front of the operator 3.

One Aspect of Effect

As described above, the information providing system 1 according to the present embodiment performs the three-dimensional measurement of a static object and the two-dimensional measurement of a position of a dynamic object of an environment, and provides to the site 2, support data that is generated at the remote site 4 through the environment grasping image based on the measurement data. Therefore, according to the information providing system 1 according to the present embodiment, support data suitable for a scene in which an operation is performed in the site 2 can be provided.

[b] Second Embodiment

The embodiment of the disclosed apparatuses has been explained. The present invention can be implemented by various forms other than the embodiment described above. In the following, other embodiments included in the present invention are explained.

Application Example of Method of Acquiring 3D Data

While in the first embodiment, a case of acquiring 3D data having the resolution of 640 pixels width×480 pixels height by controlling the 3D sensor 11 has been explained as an example, 3D data with a higher resolution can be generated by further acquiring 3D data shifting the 3D sensor 11 by a half of a pitch between pixels, that is, a half pitch, and by performing integration processing to interpolate data in gap portions between pixels between the respective pieces of the 3D data.

FIG. 13 depicts an application example of a method of acquiring 3D data. In FIG. 13, a part of a group of points in a space forming pixels of 640 pixels width×480 pixels height is depicted with black circles. Moreover, a part of a group of points of 3D data that is acquired when the 3D sensor 11 is driven by a half pitch of a pixel to a rightward direction from that of acquiring the 3D data as the group of points depicted with the block circles is depicted as dotted circles. Furthermore, in FIG. 13, a part of a group of points of 3D data that is acquired when the 3D sensor 11 is driven by a half pitch of a pixel to a downward direction from that of acquiring the 3D data as the group of points depicted with the block circles is depicted as circles with oblique lines. In addition, a part of a group of points of 3D data that is acquired when the 3D sensor 11 is driven by a half pitch of a pixel to rightward and downward directions from that of acquiring the 3D data as the group of points depicted with the block circles is depicted as white circles. By combining these four pieces of 3D data, 3D data with a resolution twice as high can be acquired.

Projection Position of Support Data

In the first embodiment described above, a case in which support data is projected at a position of a target for which specification has been accepted is explained as an example, but projection is not necessarily requested to be taken place at the position of the target for which specification has been accepted. For example, by projecting the support data within a predetermined distance from the position of the target, and in a region without a pattern in which pixels of intensity gradient is equal to or lower than a threshold are sequentially aligned, the visibility of the support data can be improved. Moreover, the support data can be projected on an AR marker closest in distance from the position of the target out of AR markers provided at the site 2.

Application Example of Contents of Support Data

In the first embodiment described above, a case in which a message or the like input by the supporter 5 is projected as the support data has been explained, but it is not limited thereto. For example, identification information of an AR marker that is provided near an inspection spot in the site 2 can be recognized by image processing, and information, such as an inspection procedure and cautions, associated with the identification information can be acquired by searching a database, and the information acquired by search can be projected as the support data. Moreover, a skilled person or a predecessor performs an on-site operation in advance, the procedure thereof is recorded to acquire an image of hands with an eyepoint of the skilled person, and the image of the skilled person is projected in an operator's perspective. Thus, the operator 3 can perform the operation, following the movement of hands of the skilled person.

Cooperation with Gadget

In the first embodiment described above, a case in which the information providing apparatus 10 and the information processing apparatus 100 are included in the information providing system 1 has been explained as an example. In addition, a wearable gadget that is put on the operator 3 can also be included therein. For example, a gadget equipped with a motion sensor, such as an acceleration sensor and a gyro sensor, can be put on a wrist or a finger of the operator 3. In this case, by causing the information providing apparatus 10 or the information processing apparatus 100 to recognize a gesture, for example, a gesture of moving the gadget from left to right or the like, from a sensor value obtained by the motion sensor of the gadget, an operation relating to display contents of the support data associated with the gesture, for example, an operation to turn ON or OFF the projection of the support data, or forward paging or backward paging of the support data having more than one page, or the like can be performed.

Moreover, not limited to an operation related to display contents of the support data, an operation to specify a projection position of the support data can be accepted by gesture recognition. In this case, not limited to the gesture recognition, by sensing a light emission position of a laser pointer, or a light emitting diode (LED) integrated in or attached to the gadget from a live image, the support data can be displayed at coordinates of an intersection with a straight line connecting a trunk of the operator 3, for example a center of gravity, and the light emission point, out of three-dimensional coordinates included in the 3D sensing data. As described, when an LED is arranged in the gadget, in cooperation with the gadget, while acquiring a path according to a path of a hand, the path can be projected to the environment of the site 2. Thus, by tracing a wall surface on the environment side with a finger with the LED turned on, operation information in a letter, a picture, or the like can be drawn on the wall surface.

Furthermore, when a light emitting unit such as an LED and a hand wearable gadget that has a near-field radio communication reader such as the NFC are coordinated, and a new tag is assigned to an environment, positional information of the tag can be acquired and managed. By thus tagging an environment by an operator, positional information of an object on the environment side can be managed. For example, a tag is assigned to a malfunctioning part, and a position thereof and an inspection time are managed. Furthermore, it can be applied to such management that an administrator assigns a tag of "no entry" to a door knob, and thereafter, an alarm rings when people other than the administrator touches the door knob.

Base of Support Data Generation

While in the first embodiment described above, a case in which generation of the support data is performed by the information processing apparatus 100 has been explained as an example, the information providing apparatus 10 can be caused to generate the support data when specification of a position of a predetermined target is accepted on an environment grasping image, transmitting the position of the target for which the specification is accepted and a position of a dynamic object on the 3D image to the information providing apparatus 10 from the information, processing apparatus 100.

Distribution and Integration

Moreover, the respective components of the respective apparatuses illustrated are not necessarily requested to be configured physically as illustrated. That is, specific forms of distribution and integration of the respective apparatuses are not limited to the ones illustrated, and all or a part thereof can be configured to be distributed or integrated functionally or physically in arbitrary units according to various kinds of loads, usage conditions, and the like. For example, although a case in which the display control unit 140 and the support-data generating unit 150 are mounted in the information processing apparatus 100 used by the supporter has been given as an example, these functional units can be mounted in an external server device or the like, and the information processing apparatus 100 can be arranged only to perform input and output of information.

Information Providing Program

Furthermore, the respective processing explained in the above embodiments can be implemented by executing a program that has been prepared in advance by a computer such as a personal computer and a workstation. Therefore, in the following, one example of a computer that executes an information providing program implementing functions similar to those in the above embodiments is explained using FIG. 14.

Figure 14:
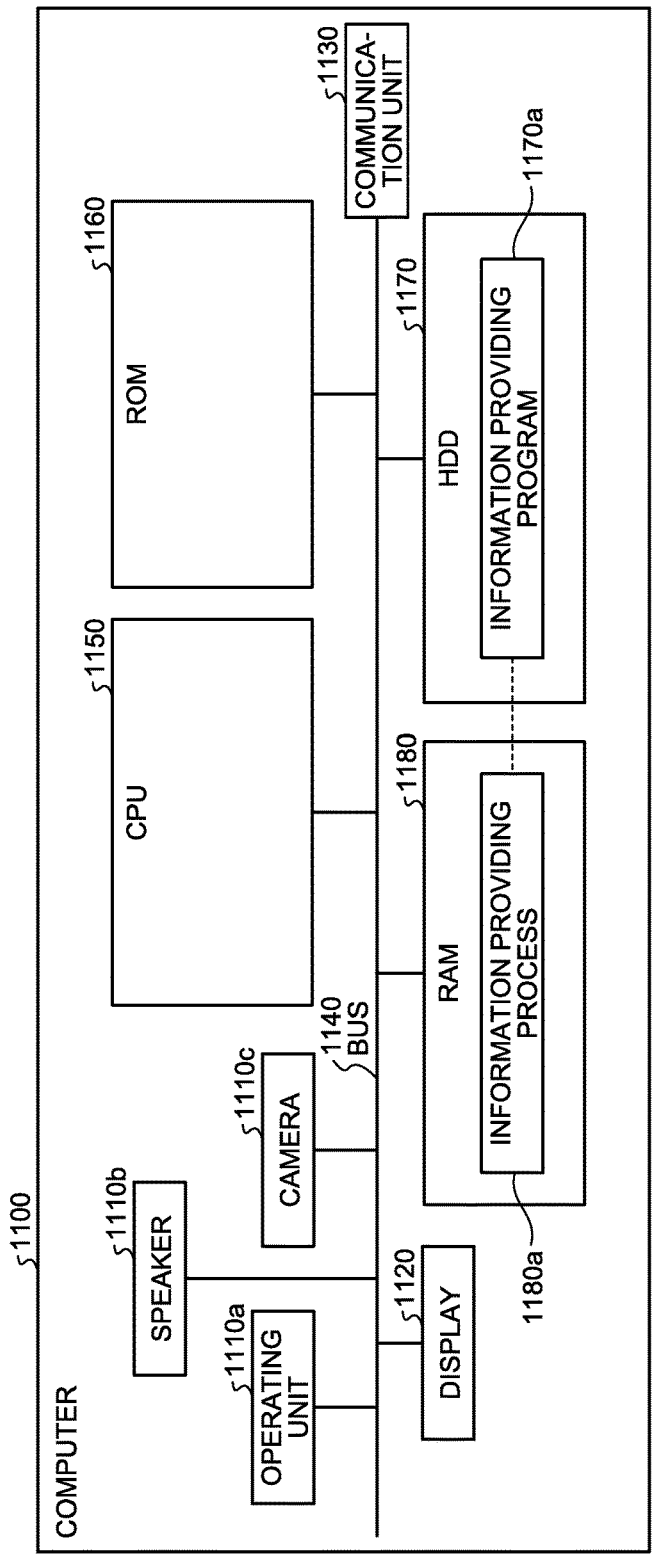
FIG. 14 depicts a hardware configuration example of a computer that executes an information providing program according to the first embodiment and a second embodiment.

FIG. 14 depicts a hardware configuration example of a computer that executes the information providing program according to the first embodiment and a second embodiment. As depicted in FIG. 14, a computer 1100 includes an operating unit 1110a, a speaker 1110b, a camera 1110c, a display 1120, and a communication unit 1130. Furthermore, the computer 1100 includes a CPU 1150, a read-only memory (ROM) 1160, a hard disk drive (HDD) 1170, and a RAM 1180. The respective units 1110 to 1180 are connected with each other through a bus 1140.

The HDD 1170 stores an information providing program 1170a that exerts functions similar to those of the first sensing unit 12, the second sensing unit 14, and the projection control unit 16 depicted in the first embodiment described above. Similarly to the first sensing unit 12, the second sensing unit 14, and the projection control unit 16 depicted in FIG. 2, the information providing program 1170a can be integrated or distributed. That is, ail of data mentioned in the first embodiment are not necessarily requested to be stored in the HDD 1170. It is only necessary to have data that is used for processing stored in the HDD 1170.

Under such an environment, the CPU 1150 develops the information providing program 1170a read from the HDD 1170 on the RAM 1180. As a result, the information providing program 1170a functions as an information providing process 1180a as depicted in FIG. 14. This information providing process 1180a develops various kinds of data read from the HDD 1170 in a region assigned to the information providing process 1180a out of a storage region of the RAM 1180, and performs various kinds of processing by using the developed various kinds of data. For example, as one example of processing performed by the information providing process 1180a, a part of the processing indicated in FIG. 10, the processing indicated in FIG. 12, or the like is included. In the CPU 1150, it is not necessarily requested that all the processing units described in the first embodiment described above operate, but it is only necessary to implement virtually a processing unit corresponding to processing to be performed.

The information providing program 1170a is not necessarily requested to be stored in the HDD 1170 or the ROM 1160 from the beginning. For example, the program can be stored in a "portable physical medium", such as a flexible disk (FD), a compact-disc read-only memory (CD-ROM), a digital versatile disk (DVD), a magneto-optical disk, or an integrated circuit (IC) card, that is inserted into the computer 1100, and the computer 1100 can read the respective programs from these portable physical media to execute it. Moreover, the respective programs can be stored in another computer or a server device that is connected to the computer 1100 through a public line, the Internet, a LAN, a WAN, or the like, and the computer 1100 can be arranged to acquire the programs therefrom to execute the respective programs.

Support data suitable for a scene in which an operation is performed at a site can be provided.

All examples and conditional language recited herein are intended for pedagogical purposes of aiding the reader in understanding the inversion and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information providing method comprising:
   measuring a static object three-dimensionally in an environment, by a processor;
   sequentially measuring a position of a dynamic object in the environment, by the processor;
   transmitting measurement data of the static object measured to a predetermined information processing apparatus through a communication network;
   transmitting measurement data of the dynamic object measured to the information processing apparatus through a communication network;
   receiving support data from the information processing apparatus based on an environment grasping image that is generated from the measurement data of the static object and the measurement data of the dynamic object by the information processing apparatus; and
   presenting the received support data to the environment at predetermined timing, by the processor.

2. The information providing method according to claim 1, wherein
   the support data includes positional data that indicates a part of the static object, and
   the presenting includes presenting the support data based on a measurement position of the dynamic object and the positional data that is included in the support data.

3. The information providing method according to claim 1, further including
   receiving a presentation condition together with the support data, wherein
   the presenting includes presenting the support data based on the presentation condition.

4. A non-transitory computer-readable recording medium storing an information providing program that causes a computer to execute a process comprising:
   measuring a static object three-dimensionality in an environment;
   sequentially measuring a position of a dynamic object in the environment;
   transmitting measurement data of the static object measured to a predetermined information processing apparatus through a communication network;
   transmitting measurement data of the dynamic object measured to the information processing apparatus through a communication network;
   receiving support data from the information processing apparatus based on an environment grasping image that is generated from the measurement data of the static object and the measurement data of the dynamic object by the information processing apparatus; and
   presenting the received support data to the environment at predetermined timing.

5. The non-transitory computer-readable recording medium according to claim 4, wherein the support data includes positional data that indicates a part of the static object, and the presenting includes presenting the support data based on a measurement position of the dynamic object and the positional data that is included in the support data.

6. The non-transitory computer-readable recording medium according to claim 4, further including receiving a presentation condition together with the support data, wherein the presenting includes presenting the support data based on the presentation condition.

7. An information providing system comprising:

a first apparatus; and a second apparatus, wherein the first apparatus includes a first, processor configured to:

measure a static object three-dimensionally in an environment;

sequentially measure a position of a dynamic object in the environment;

transmit measurement data of the static object measured to the second apparatus through a communication network;

transmit measurement data of the dynamic object measured to the second apparatus through a communication network;

receive support data from the second apparatus based on an environment grasping image that is generated from the measurement data of the static object and the measurement data of the dynamic object by the second apparatus; and present the received support data to the environment at predetermined timing, and the second apparatus includes a second, processor configured to:

receive measurement data of the static object from the first apparatus;

receive measurement data of a dynamic object each time a position of the dynamic object in the environment is measured by the first apparatus;

cause a predetermined display to display an environment grasping image in which a position pf the dynamic object is superimposed on a three-dimensional image that is generated from the measurement data of the static object of the environment;

generate, when specification of a position of a predetermined target on the environment grasping image is accepted, support data based on the position of the target for which the specification is accepted and a position of the dynamic object in the three-dimensional image; and transmit the support data to the first apparatus.

* * * * *